United States Patent [19]
Harimoto et al.

[11] Patent Number: 5,528,706
[45] Date of Patent: Jun. 18, 1996

[54] CAGE FOR ROLLER BEARINGS

[75] Inventors: Kazuyoshi Harimoto, Iwata; Tsutomu Hashimoto, Kakegawa; Eiji Ohsugi, Iwata-gun; Keiji Suzuki, Iwata; Kiyoshi Kaneko, Iwata-gun; Atsushi Yamashita, Fukuroi, all of Japan

[73] Assignee: NTN Corporation, Osaka, Japan

[21] Appl. No.: 328,678

[22] Filed: Oct. 25, 1994

[30] Foreign Application Priority Data

Oct. 29, 1993 [JP] Japan ..................... 5-272061

[51] Int. Cl.$^6$ ............... F16C 33/46; F16C 33/56
[52] U.S. Cl. ............... 384/573; 384/523; 384/579; 384/625
[58] Field of Search ............... 384/523, 572, 384/573, 575, 577, 579, 625

[56] References Cited

U.S. PATENT DOCUMENTS

| | | | |
|---|---|---|---|
| 2,591,160 | 4/1952 | Kilian | 384/575 |
| 2,711,938 | 6/1955 | Herrmann | 384/572 |
| 3,228,090 | 1/1966 | Schaeffler | 384/572 X |
| 3,473,857 | 10/1969 | Pitner | 384/572 |
| 5,184,899 | 2/1993 | Harimoto et al. | 384/577 X |

*Primary Examiner*—Thomas R. Hannon
*Attorney, Agent, or Firm*—Nikaido Marmelstein Murray & Oram

[57] ABSTRACT

A cage for a roller bearing which is free of fretting and abnormal noise, which can be manufactured at low cost, and which can be easily mounted in the bearing. The cage is formed by bending a metal sheet having pockets into a ring shape, temporarily joining its ends, heat-treating the ring thus formed to remove stress, and separating the temporarily joined portion. Such a cage tends to rotate slower than the raceway members on the driving side of the bearing, making it possible to reduce fretting. Such a cage can be used under high-temperature conditions.

6 Claims, 9 Drawing Sheets

CAGE FOR ROLLER BEARINGS

BACKGROUND OF THE INVENTION

This invention relates to a cage for a roller bearing, a method for manufacturing the same, and a roller bearing having such a cage mounted therein, and more particularly to an improved cage which can prevent fretting and abnormal noise while in operation.

A roller bearing is used as an idler bearing for a car transmission. When shifting the gear positions in the transmission, the gears are rotated under load together with the shaft, so that in the roller bearing, the relative rotation speed between the raceway members and the rollers becomes zero. Namely, in this state, the relative position between the raceway members and the rollers is maintained. Thus, at frequently used shift positions, the raceway members and the rollers tend to suffer fretting on their surfaces due to vibrations while the car is moving.

One way to prevent such fretting is to form roller receiving pockets in the cage at unequal pitches. By forming the pockets at unequal pitches, the rollers are prevented from stopping at the same positions. This makes it possible to delay the onset of fretting. But since the cage has an integral one-piece structure, if the shaft and the housing are rotated in unison for a long time, e.g. if the car is driven with the same shift position for a long time, no relative rotation will occur in the bearing, so that fretting is not completely eliminated.

Further, in order to form pockets at unequal pitches, the entire cage has to be formed solely by cutting. This results in lower productivity and thus higher production cost.

Another way to prevent fretting is the use of a split cage formed with a cut. By splitting the cage, it can rotate relative to the other parts of the bearing, so that fretting can be prevented effectively.

In this type of cage, there are single-cut cages and double-cut ones. The former is usually limited to ones made of synthetic resin. Thus, such a cage cannot be used at too high temperatures. If such a single-cut cage is formed of metal, such restrictions in the use conditions are eliminated. But when a ring-shaped metal member is cut at one point after forming pockets to obtain a single-cut cage, residual stresses in the metal cage are released, so that the cut portion tends to open up remarkably.

A double-cut cage is a cage cut apart into two separate parts. These two separate parts have to be mounted individually between the inner and outer raceway members. Thus, assembling such a cage into a bearing is very difficult and troublesome.

An object of this invention is to provide a cage for roller bearing which can prevent fretting and abnormal noise during operation of the bearing, and which can be easily manufactured and assembled into a bearing.

Another object of this invention is to provide a method for manufacturing such a cage with high accuracy and at low cost.

SUMMARY OF THE INVENTION

In order to attain these objects, a first cage according to the present invention is in the form of a ring-shaped member formed with a plurality of circumferentially arranged roller-receiving pockets and having a cut portion in circumference thereof, wherein the ring-shaped member is subjected to a heat treatment to remove any stresses in the cage after temporarily joining the cut portion by welding.

The roller-receiving pockets may be formed at uneven pitches. The heat treatment carried out to remove stresses may be soft nitriding treatment.

A second cage according to this invention is characterized in that the abovementioned cut portion is temporarily joined by welding with a strength higher than a thermal stress acting on the ring-shaped member when subjected to the heat treatment and lower than a stress acting on the ring-shaped member from component parts of the roller bearing while the cage is rotating relative to the component parts of the roller bearing after the cage has been mounted in the roller bearing.

The method of manufacturing a cage for use in a roller bearing according to this invention comprises the steps of forming in a steel sheet a plurality of roller-receiving pockets arranged in a longitudinal direction, bending the steel sheet into a ring shape, temporarily joining the opposed ends of the steel sheet thus bent by welding to form a ring-shaped cage, and subjecting the ring-shaped cage to heat treatment to remove stresses.

The ends of the steel sheet should be brought so as to form parallel surfaces opposite to each other after bending the steel sheet.

The first roller bearing according to this invention comprises inner and outer raceway members, the abovementioned first cage, and a plurality of rollers, wherein the rollers are inserted in the respective pockets after cutting the cage at the portion joined temporarily by welding, and wherein the cage is mounted between the inner and outer raceway members with the rollers received in the pockets.

The second roller bearing according to this invention comprises inner and outer raceway members, the abovementioned second cage, and a plurality of rollers, wherein the cage is mounted between the inner and outer raceway members with the rollers received in the pockets.

The ring-shaped member of the first cage has a cut-apart portion which is subsequently joined. In this state, the ring member is subjected to heat treatment to remove any residual stresses produced when e.g. forming the pockets. After stresses have been removed, the joined portion is cut. Thus, it is possible to prevent the cut portion from opening up widely due to spring-back.

This arrangement makes it possible to form a split type cage from a metal without lowering its outer dimensional accuracy. By mounting such a cage in a roller bearing, it is possible to prevent fretting and abnormal noise during operation.

On the other hand, by setting the breaking strength at the joined portion of the ring-shaped member as in the second cage as mentioned above, the cage can be subjected to heat treatment while keeping the continuous ring shape. Thus, it is possible to remove residual stresses without the possibility of opening-up of the cut portion or any detrimental deformation of the cage. When the roller bearing is rotated after mounting the cage, stress is applied to the cage from the component parts of the bearing, thus breaking the welded portion of the ring member. The cage now acts as a split type cage in the bearing. Thus, it can effectively prevent fretting.

In the method of manufacturing a cage according to this invention, pockets are formed in a straight steel sheet. Thus, the pockets can be formed in a simple and easy way as by punching. In fact, with this method, it is extremely easy to form pockets at uneven pitches. After forming the steel sheet into a ring-shaped cage, it can be mounted in a roller bearing very easily.

On the other hand, the first roller bearing according to this invention has a cage which is cut apart beforehand. The second roller bearing has a cage which is adapted to be cut apart while the bearing is rotating. Either of the bearings is free of fretting and abnormal noise during operation. Their use conditions are not limited at all.

Other features and objects of the present invention will become apparent from the following description made with reference to the accompanying drawings, in which:

DETAILED DESCRIPTION OF THE PREFERRED EMBODIMENT

Figure 1:
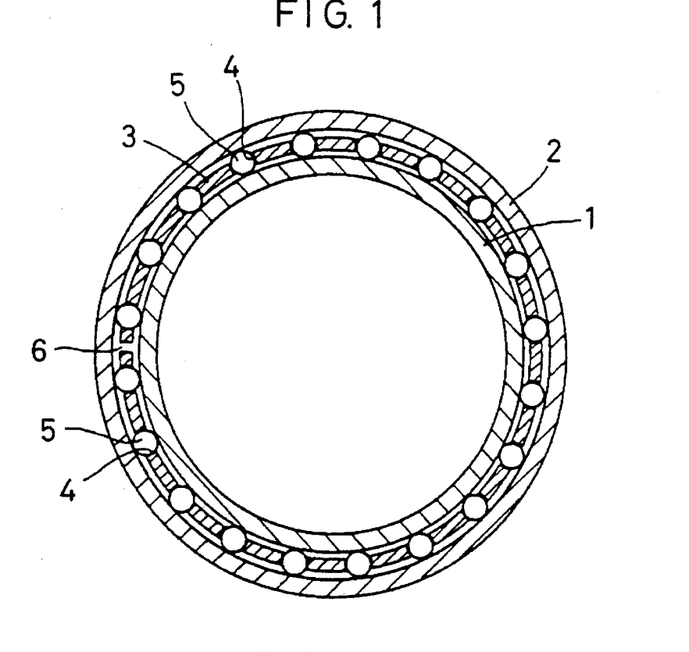
FIG. 1 is a vertical sectional front view of a roller bearing of a first embodiment.
Figure 2:
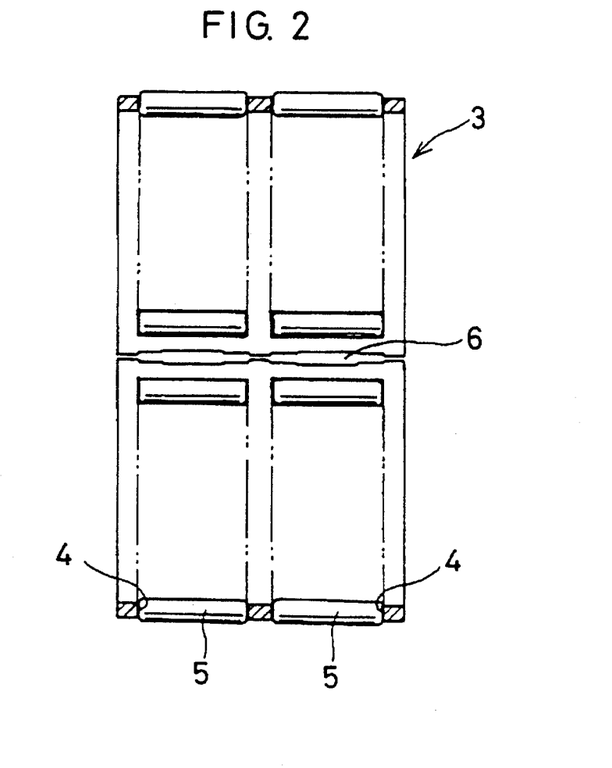
FIG. 2 is a vertical sectional side view of a cage of the first embodiment.

FIG. 1 shows the roller bearing of the first embodiment. FIG. 2 shows a cage mounted in the roller bearing.

This roller bearing comprises an inner ring 1, an outer ring 2 mounted around the inner ring 1, an annular cage 3 mounted between the inner and outer rings and formed with a plurality of pockets 4, and rollers 5 mounted in the pockets 4.

The cage 3 is formed with a single cut 6 that extends across its width.

The roller bearing of this embodiment is basically the same in structure as a conventional roller bearing having a cage made of synthetic resin and formed with a single cut, except that the cage 3 of this embodiment is made of a metal and formed by subjecting a ring with a single cut to heat treatment.

Figure 3:
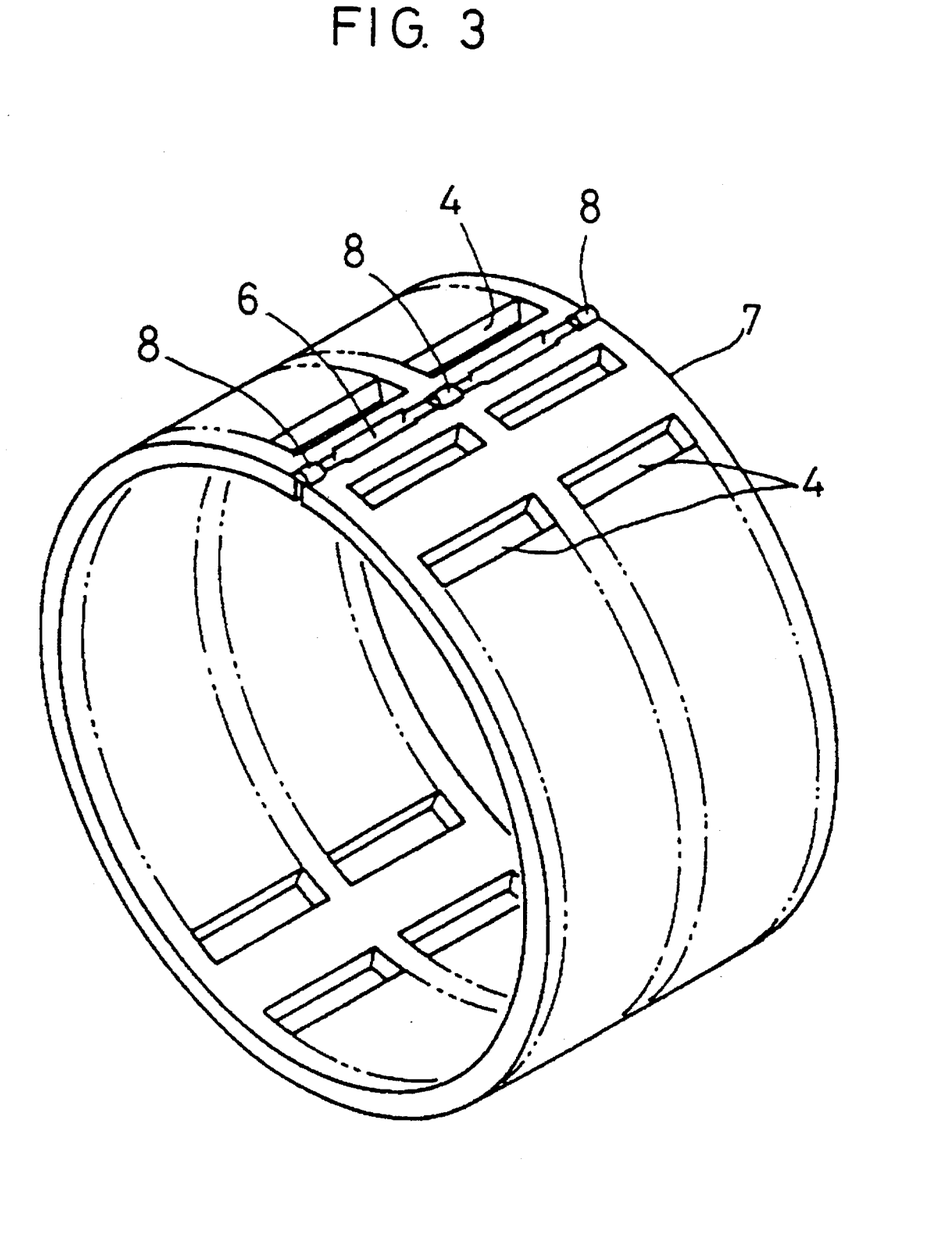
FIG. 3 is a perspective view of a temporarily welded ring.

Namely, the cage 3 of this embodiment is formed by punching pockets 4 in a steel sheet, rolling the punched steel plate into a cylindrical member having a cut 6 as shown in FIG. 3, and temporarily joining the cut 6 by welding at portions 8.

In the temporarily joined state, the cage 3 is heated for thermal refining to release any residual stresses that may be produced in the split ring when forming the pockets and bending the steel sheet. Heat-treating conditions are not limited provided residual stresses are removed. Soft nitriding treatment is especially preferable because it can not only remove residual stresses but can improve the fatigue strength and wear resistance of the cage.

Rollers 5 are fitted in the pockets 4 of the split ring thus heat-treated, with the cut portion 6 temporarily joined. Before mounting this cage in the bearing, the temporarily welded portions 8 are cut to obtain a split cage.

Since the rollers 5 can be fitted in the cage with the cut portion 6 temporarily joined, assembling work can be done easily and efficiently. But the rollers 5 may be fitted in the cage 3 with the temporarily welded portions 8 cut apart.

The temporarily joined portions 8 of the cage 3 can be cut apart easily by inserting a tapered corn into the cage 3 or using a cutter.

As mentioned above, the cage 3 of this embodiment is heat-treated with the cut-apart portion temporarily joined together. After releasing stresses by the heat treatment, the temporarily joined portions are cut apart. Thus, the cut 6 will never open due to spring-back. This makes it possible to form the cage with high dimensional accuracy. Also, the cage can be manufactured by the same method as used when manufacturing a welded cage. The conventional step of correcting the outer dimensions are not necessary any more. This improves the working efficiency and lowers the manufacturing cost of the cage.

This single-cut cage 3 is mounted between the inner ring 1 and outer ring 2 after fitting the rollers 5 therein. Since a radial gap is formed between the cage 3 and the raceway member on the driving side, the rotation of the cage tends to delay relative to the raceway member. This relative rotation serves to reduce fretting on the surfaces of the rollers 5 and the inner and outer rings 1, 2. Furthermore, formed of a metal, this cage can be used under high-temperature conditions.

FIGS. 4 through 9 show the second embodiment.

Figure 4:
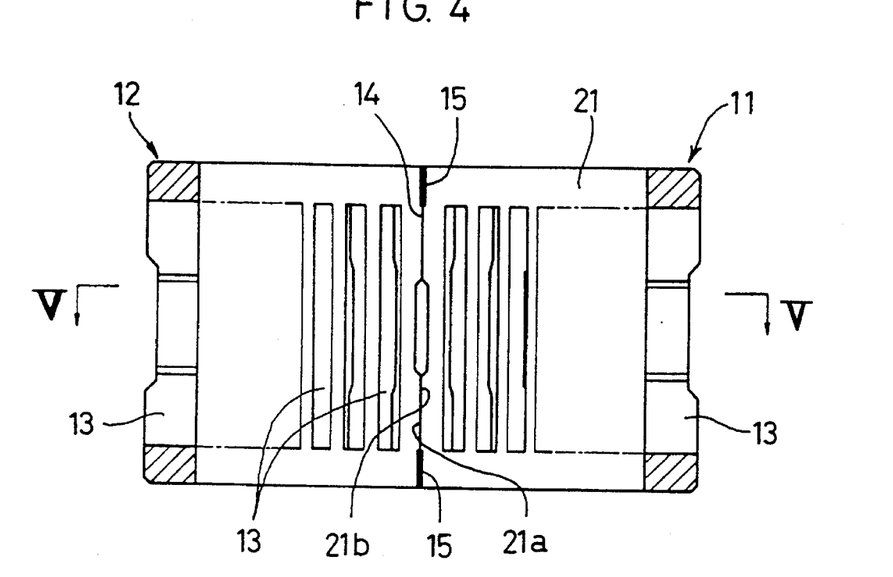
FIG. 4 is a vertical sectional side view of a cage of a second embodiment.
Figure 5:
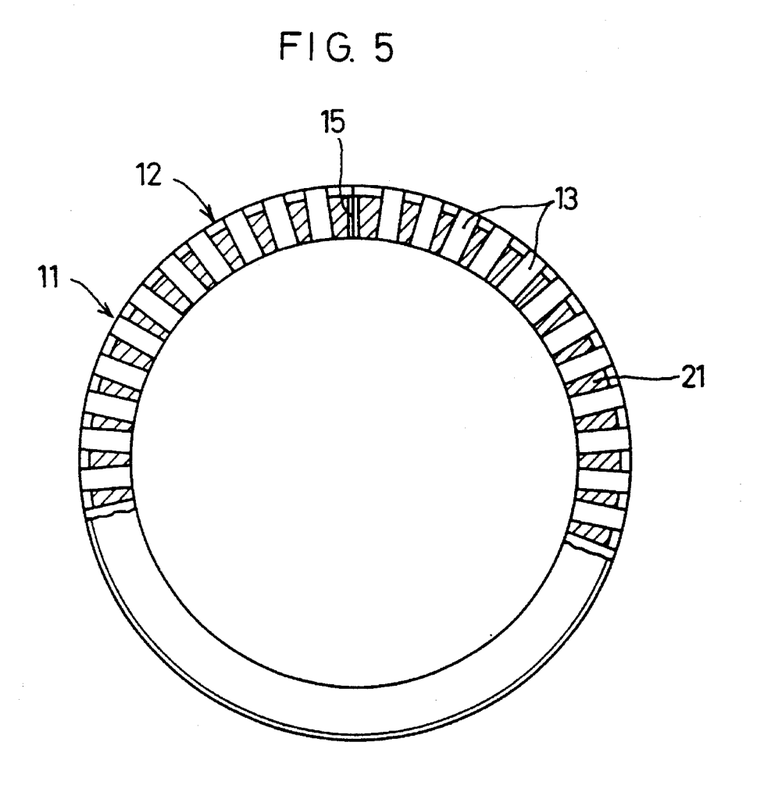
FIG. 5 is a sectional view taken along line V—V of FIG. 4.

As shown in FIGS. 4 and 5, the cage 11 of this embodiment has a ring-shaped cage body 12 formed with a large number of roller receiving pockets 13 at uneven circumferential pitches.

The cage body 12 is cut at one portion 14 in its circumference. The cut portion 14 is welded (at portions 15) to form an uninterrupted ring.

The roller receiving pockets 13 may be formed so that the pockets in each of a plurality of equally segmented areas of the cage body 12 are arranged at uneven pitches in the same pattern as the pockets in the other segments. Otherwise, the pockets in the entire cage body may be arranged at uneven pitches, not divided in segments.

Figure 6:
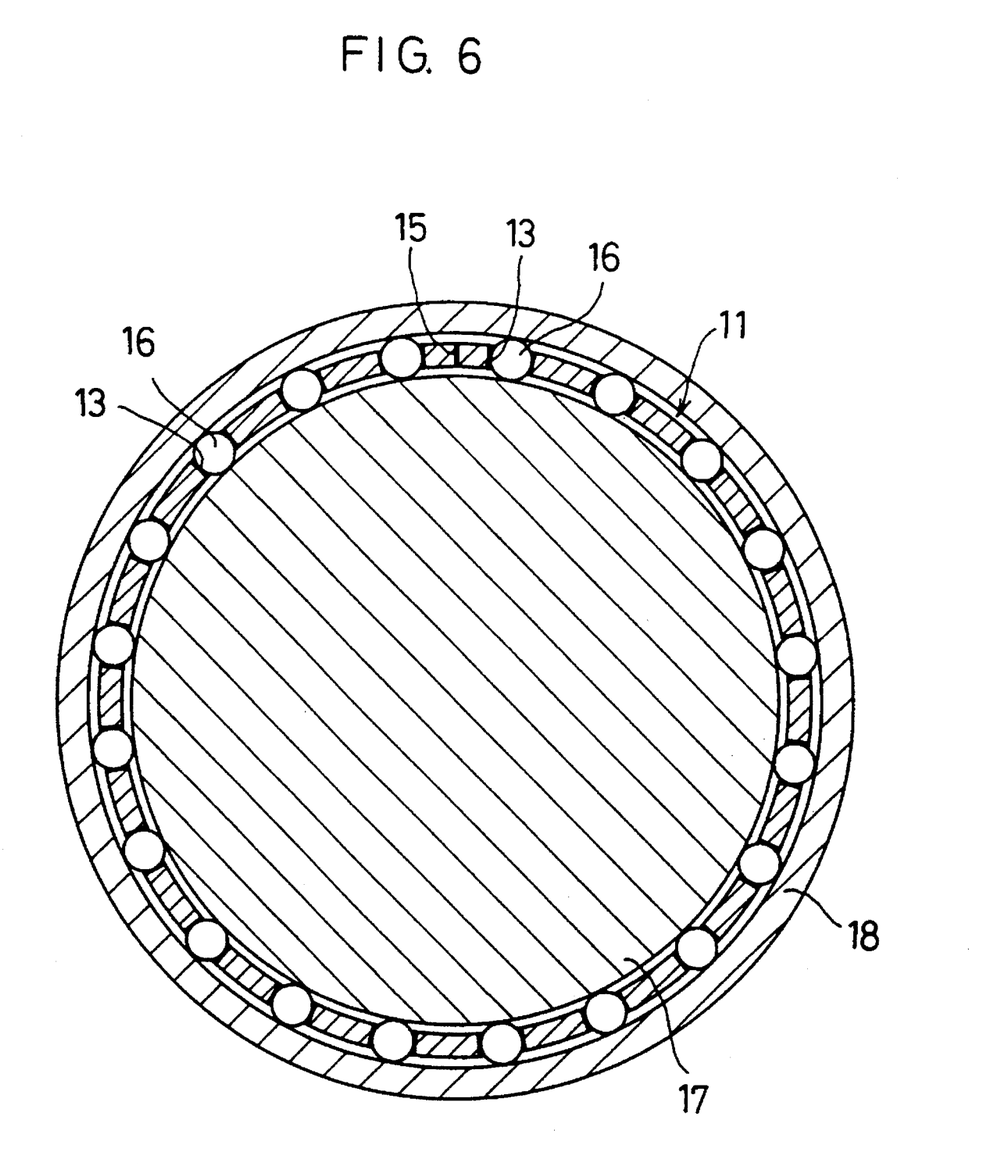
FIG. 6 is a vertical sectional front view of a roller bearing with a cage mounted therein.

FIG. 6 shows the state in which the cage 11 having rollers 16 received in the pockets 13 is mounted in a roller bearing. In the figure, numeral 17 indicates a shaft and 18 an outer ring.

We will now describe the steps of manufacturing the cage body 12.

Figure 7:
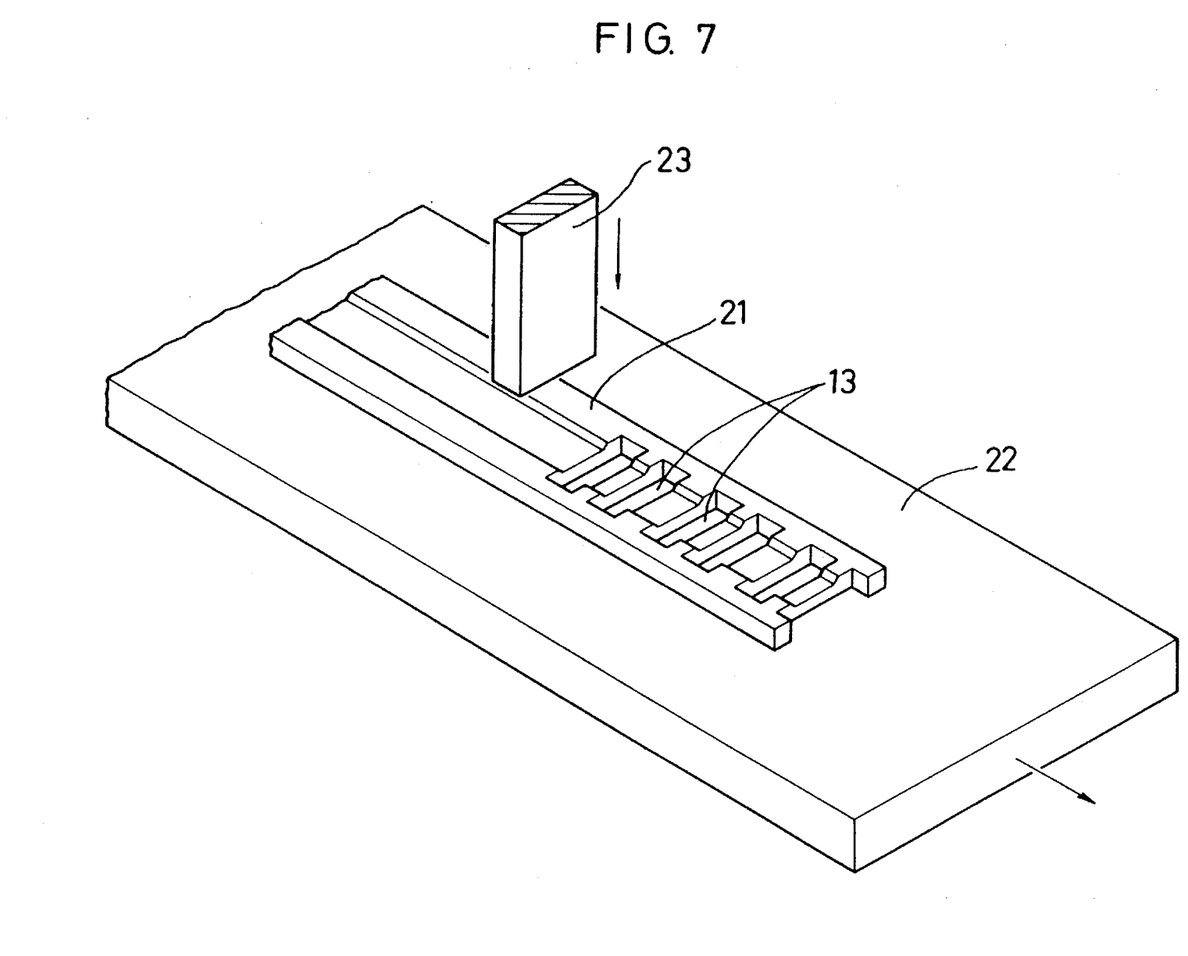
FIG. 7 is a perspective view showing how pockets are formed in a steel sheet.

As shown in FIG. 7, a strip of steel sheet 21 is placed on a die 22 and many longitudinally arranged pockets 13 are formed in the steel sheet 21 at uneven pitches by a punch 23.

Figure 8A:
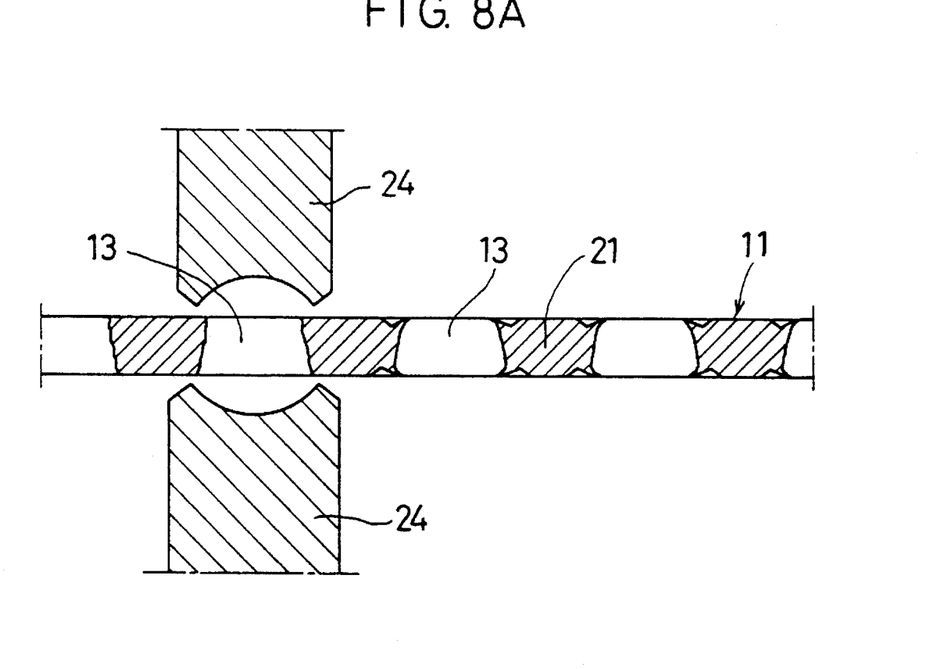
FIG. 8A is a sectional view showing how roller stopper claws are formed in the pockets.
Figure 8B:
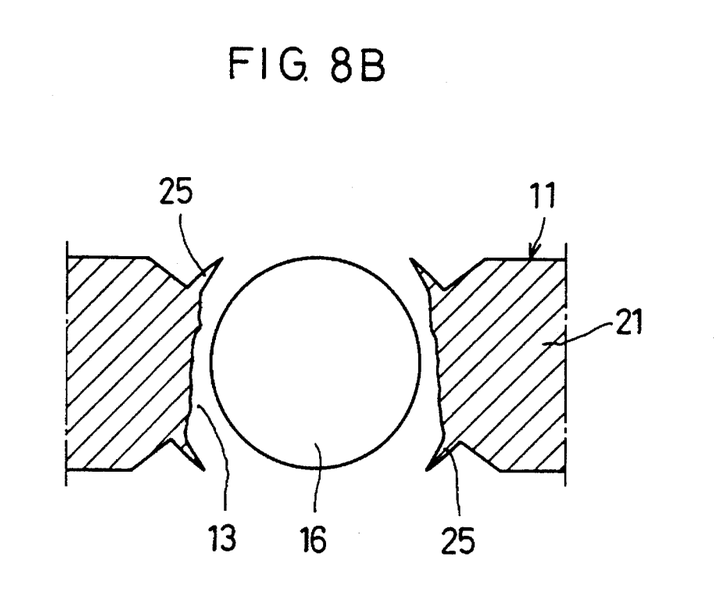
FIG. 8B is a sectional view of such roller stopper claws.

Then, as shown in FIG. 8, claw-forming punches 24 are driven from top and bottom of the steel sheet 21 to form roller stopper claws 25 on both sides of the pockets 13 for preventing the rollers 16 from dropping out of the pockets.

Figure 9:
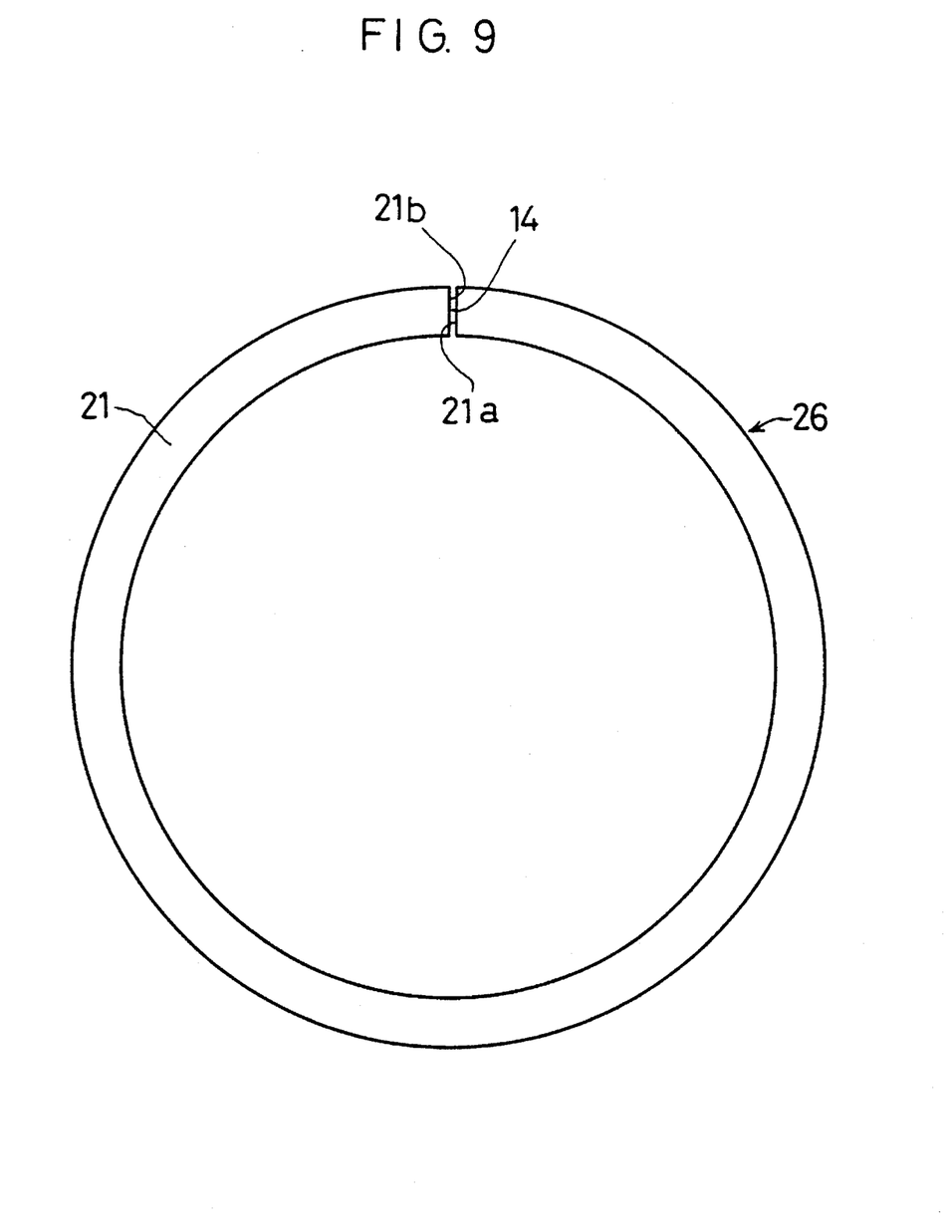
FIG. 9 is a front view of a not-yet-welded ring member.

After forming the pockets 13 and the roller stopper claws 25, the steel sheet 21 is bent or rolled circumferentially as shown in FIG. 9 until its ends 21a, 21b abut each other to form a ring-shaped member 26. Then, the ends 21a and 21b of the member 26 are joined together by welding.

In this case, the ends are welded together only temporarily. Namely, the breaking strength at the temporarily welded portion should be higher than the thermal stress applied to the member 26 when performing heat treatment, which will be described later, and lower than the stress applied to the cage 11 from the shaft 17, outer ring 18 and roller 16 of the bearing (FIG. 6) when they are rotating relative to each other.

Figure 10A:
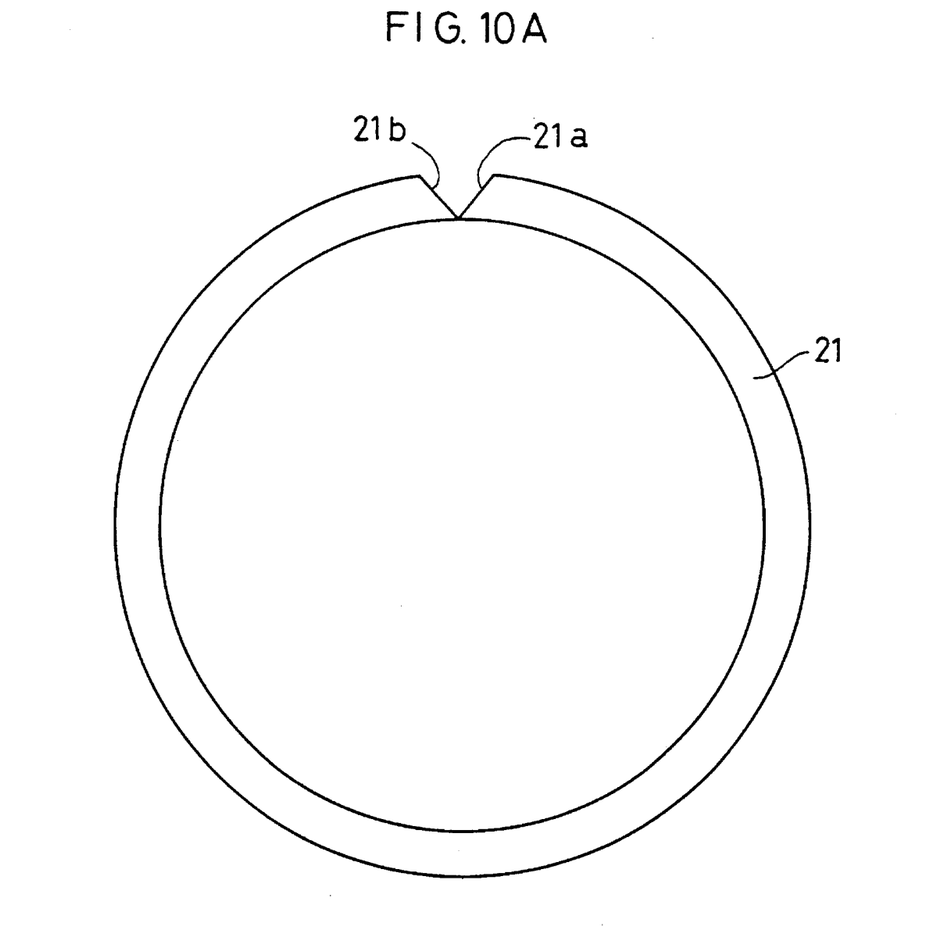
FIG. 10A is a front view of the steel sheet having its ends joined together.
Figure 10B:
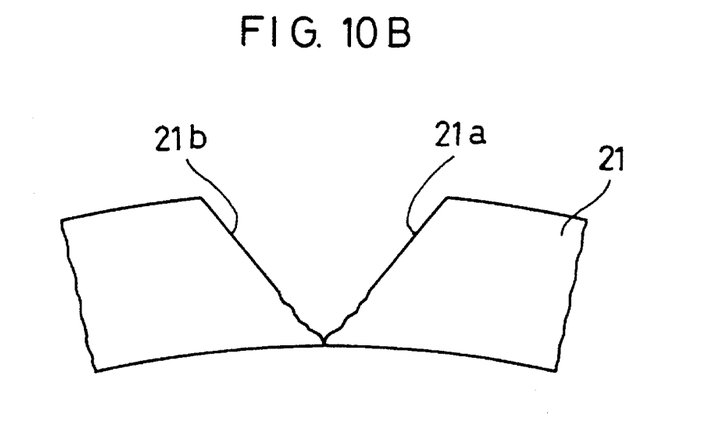
FIG. 10B is a partial enlarged view thereof.

If the steel sheet 21 is simply bent before welding its ends, its opposite ends will be formed in a V-shape as shown in FIG. 10 because the outer and inner peripheries of the steel sheet 21 are of the same length. If the ends of the steel sheet 21 are welded in this state, the pointed tip of the letter V will be welded first where the ends of the steel sheet are in line contact with each other. Since the contact area of such line-contact portion is uneven, welding also tends to be uneven. This makes it difficult to set the breaking strength at the welded portion within the above-described range. Also, since the ends of the steel sheet 21 are not uniformly in contact with each other, the material of the steel sheet may melt by welding and flow toward the inside of the ring-shaped steel sheet, thus forming welding burr.

Figure 11:
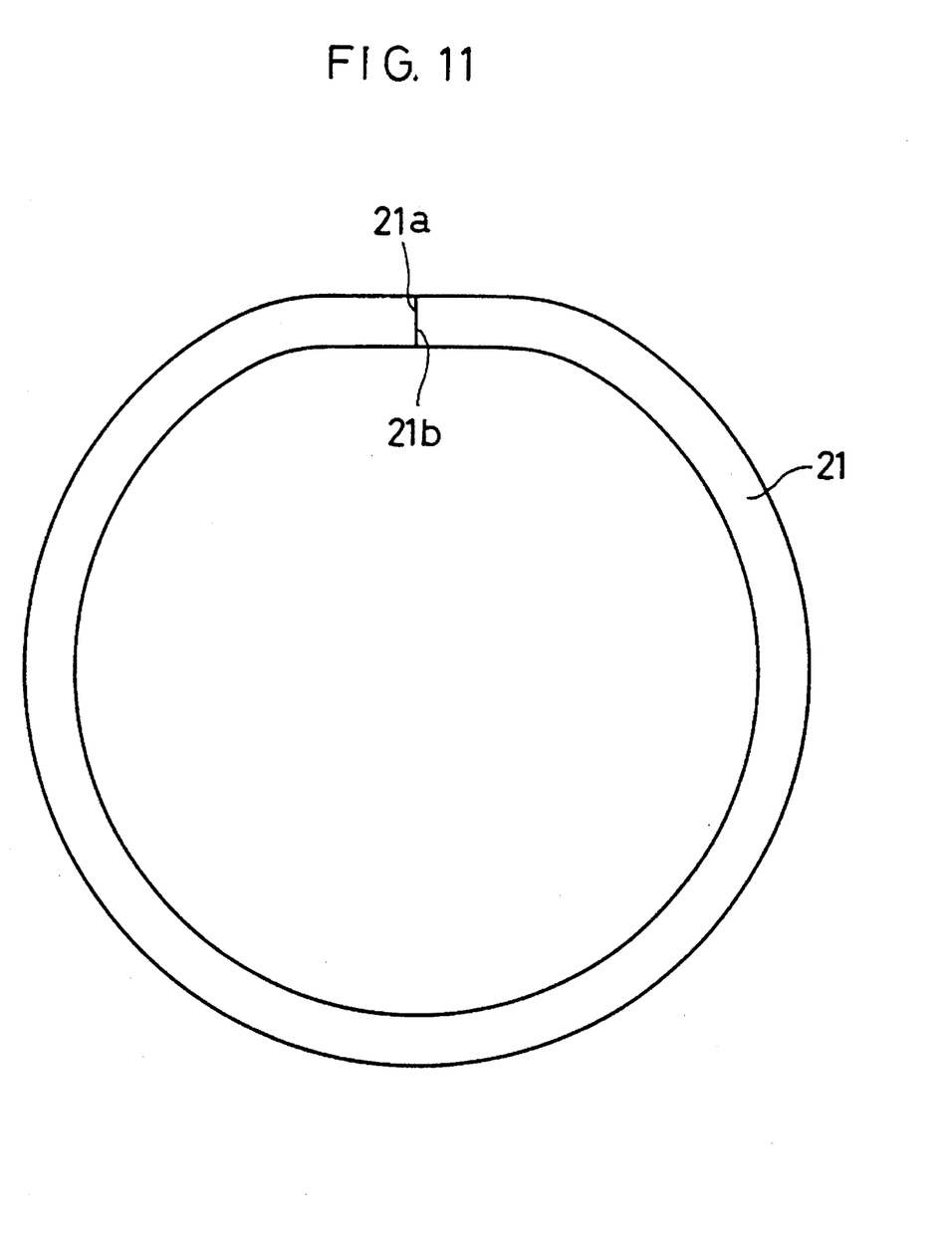
FIG. 11 is a front view of the steel sheet having its ends joined together.

In contrast, in the arrangements shown in FIGS. 9 and 11, the ends 21a, 21b of the steel sheet 21 are brought into surface-to-surface contact when the steel sheet is bent by subjecting both ends 21a and 21b to surface treatment (FIG. 9) or deforming the steel sheet 21 itself beforehand (FIG. 11). Since the ends 21a, 21b are in surface-to-surface contact, the contact area will stabilize, so that the ends 21a, 21b can be welded together stably. This makes it possible to set the welding strength within the abovementioned range with high accuracy.

After welding the ends of the ring-shaped member 26, it is heated to a temperature level for thermal refining to release any residual stresses produced in the member 26 when forming pockets and bending the steel sheet.

Rollers 16 are inserted into the respective pockets 13 of the continuous ring-shaped cage 11 thus formed. The cage 11 is then mounted in a roller bearing.

Since the cage 11 has a continuous ring shape, it practically acts as a cage having pockets arranged at uneven pitches. Thus, the pockets 13 serve to minimize fretting at the initial stage of operation of the bearing, so that the life of the bearing is prolonged.

When the bearing gets into a normal operation state, the welded portion 15 at the ends of the steel sheet 21 will be broken by the stress applied to the cage 11 from the shaft 17 or outer ring 18 and the rollers 16, which are rotating relative to each other. The cage 11 now acts as a single-cut cage which is separated at one point. In this state, the rollers 16 and the shaft 17 or outer ring 18 will rotate relative to each other, guided by the split cage. Fretting and abnormal noise are thus suppressed more effectively, so that the life of the bearing is prolonged even further.

Formed of a metal sheet, the cage 11 of this embodiment has much higher heat resistance than a cage made of a synthetic resin. Its use is thus less limited by environmental conditions such as temperature.

In the second embodiment, the welding strength at the welded portion 15 of the cage 11 is set to such a level that the welded portion will be broken during operation of the bearing. But such welding strength may be set much higher so that the welding will not be broken during operation of the bearing. Even with this arrangement, the pockets, which are arranged at uneven pitches, serve to suppress fretting. Thus, it is possible to sufficiently prolong the life of the bearing.

The shaft 17 forming the bearing of the embodiments may be replaced with an inner ring.

What is claimed is:

1. A cage for use in a roller bearing wherein said cage is in the form of a ring-shaped member formed with a plurality of circumferentially arranged roller-receiving pockets and having a cut portion in circumference thereof, and wherein said ring-shaped member is subjected to a heat treatment to remove any stresses in the cage after temporarily joining said cut portion by welding.

2. A cage for a roller bearing as claimed in claim 1 wherein said roller-receiving pockets formed in said ring-shaped member are arranged at uneven pitches.

3. A cage for a roller bearing as claimed in claim 1 wherein said heat treatment is a soft nitriding treatment.

4. A cage for a roller bearing as claimed in any of claims 1-3 wherein said cut portion is temporarily joined by welding with a strength higher than a thermal stress acting on said ring-shaped member when subjected to the heat treatment and lower than a stress acting on said ring-shaped member from component parts of the roller bearing while the cage is rotating relative to said component parts of the roller bearing after the cage has been mounted in the roller bearing.

5. A roller bearing comprising inner and outer raceway members, the cage as claimed in any of claims 1-3, and a plurality of rollers, wherein said rollers are inserted in said respective pockets after cutting said cage at the portion joined temporarily by welding, and wherein said cage is mounted between said inner and outer raceway members with said rollers received in said pockets.

6. A roller bearing comprising inner and outer raceway members, the cage as claimed in claim 4, and a plurality of rollers, wherein said cage is mounted between said inner and outer raceway members with said rollers received in said pockets.

\* \* \* \* \*